(12) United States Patent
Kitade et al.

(10) Patent No.: US 12,737,910 B2
(45) Date of Patent: Sep. 15, 2026

(54) IMAGE RECOGNITION DEVICE

(71) Applicant: NTT DOCOMO, INC., Tokyo (JP)

(72) Inventors: Takuya Kitade, Chiyoda-ku (JP); Keisuke Yamaya, Chiyoda-ku (JP); Ryosuke Mizuno, Chiyoda-ku (JP); Takuma Matsumura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/853,622

(22) PCT Filed: Mar. 24, 2023

(86) PCT No.: PCT/JP2023/011915
§ 371 (c)(1),
(2) Date: Oct. 2, 2024

(87) PCT Pub. No.: WO2023/199729
PCT Pub. Date: Oct. 19, 2023

(65) Prior Publication Data

US 2025/0225669 A1 Jul. 10, 2025

(30) Foreign Application Priority Data

Apr. 14, 2022 (JP) ................................ 2022-067037

(51) Int. Cl.
*G06T 7/60* (2017.01)
*G01B 11/02* (2006.01)
*G06V 10/14* (2022.01)

(52) U.S. Cl.
CPC ................ *G06T 7/60* (2013.01); *G01B 11/02* (2013.01); *G06V 10/14* (2022.01)

(58) Field of Classification Search
CPC ................................................ G01N 21/8901
See application file for complete search history.

(56) References Cited

U.S. PATENT DOCUMENTS 6,889,903 B1 * 5/2005 Koenck ................ G06K 7/1093 235/472.01
2013/0208105 A1 * 8/2013 Schmidt ............. G01N 21/9054 348/92
2021/0195853 A1 * 7/2021 Barnes ................ A23N 15/045

FOREIGN PATENT DOCUMENTS

JP 7-43779 U 9/1995
JP 10-137695 A 5/1998
(Continued)

OTHER PUBLICATIONS

Li, J., Wang, Q., Ma, J. and Guo, J., 2022. Multiâdefect segmentation from faÃ§ade images using balanced copypâste method. ComputerâAided Civil and Infrastructure Engineering, 37(11), pp. 1434-1449. (Year: 2022).*

(Continued)

*Primary Examiner* — Clifford Hilaire
(74) *Attorney, Agent, or Firm* — Oblon, McClelland, Maier & Neustadt, L.L.P.

(57) ABSTRACT

An image recognition device that can accurately recognize a recognition target is provided. An image recognition device 10 includes an imaging device 100 configured to image one imaging surface (for example, a top surface) of a recognition target T, a mirror unit **10*a* that is a reflection unit disposed to reflect another imaging surface (for example, a side surface) of the recognition target T to the imaging device 100, and a recognition unit 103** configured to recognize the recognition target T on the basis of a first image of the one imaging surface (the top surface) and a second image of the other imaging surface (the side surface). With this configuration, it is possible to obtain images of surfaces at a plurality of positions such as side surfaces of a recognition target through one imaging operation and to improve the recognition accuracy of a recognition target. Even when a recognition target has been rolled and placed, the recogni- (Continued)

tion target can be imaged in at least two directions, and thus it is possible to improve the recognition accuracy.

5 Claims, 13 Drawing Sheets

(56) References Cited

FOREIGN PATENT DOCUMENTS

| | | | |
|---|---|---|---|
| JP | 2014-136214 | A | 7/2014 |
| JP | 2018-205900 | A | 12/2018 |
| JP | 2019-109577 | A | 7/2019 |
| JP | 2021-189143 | A | 12/2021 |

OTHER PUBLICATIONS

International Search Report mailed on May 16, 2023 in PCT/JP2023/011915 filed on Mar. 24, 2023 (2 pages).

English Translation of International Preliminary Report of Patentability and Written Opinion, issued Oct. 24, 2024 in PCT/JP2023/011915, 6 pages.

* cited by examiner

20
SORTING DEVICE
21
CONVEYOR
22
FLIPPER
23
ROBOT ARM
24
AIR BLOWER
25
CONTROL DEVICE
10
IMAGE RECOGNITION DEVICE
10a
MIRROR UNIT
10b
ILLUMINATION UNIT
100
IMAGING DEVICE
101
CAMERA
102
RANGE SENSOR
103
RECOGNITION UNIT
103a
DETERMINATION TABLE
104
COMMUNICATION DEVICE

*Fig.5*

DETERMINATION TABLE

| SIZE | X*Y RANGE (ACCURACY: LOW) | Y*Z RANGE (ACCURACY: LOW) | X*Y*Z RANGE (ACCURACY: HIGH) |
| --- | --- | --- | --- |
| — — | • • • | • • • | |
| S | 100~224 | 70~157 | 700~2362 |
| M | 225~399 | 158~279 | 2363~5599 |
| L | 400~625 | 280~437 | 5600~10937 |
| — — | • • • | • • • | |

(a)

(b)

IMAGE RECOGNITION DEVICE

TECHNICAL FIELD

The present disclosure relates to an image recognition device for a recognition target such as crops.

BACKGROUND ART

Patent Literature 1 describes an invention in which a camera box for forming an imaging chamber in the form of a darkroom in which a camera is installed is provided, objects to be sorted on a carrying surface carried into the imaging chamber with rotation of a conveyor is imaged, and a contour shape, a size, and the like of the objects to be sorted are measured.

CITATION LIST

Patent Literature

[Patent Literature 1] Japanese Unexamined Patent Publication No. 2014-136214

SUMMARY OF INVENTION

Technical Problem

In sorting of recognition targets, particularly, sorting of vegetables or fruits, sorting based on sizes (weights or sizes) of crops is generally performed. In a technique of sorting crops based on areas thereof using a camera-captured image in one direction as described in Patent Literature 1, there is a problem in that the sorting accuracy is low because only one surface of crops is visible.

Therefore, in order to solve the aforementioned problem, an objective of the present disclosure is to provide an image recognition device that can accurately recognize a recognition target.

Solution to Problem

An image recognition device according to the present disclosure includes: an imaging unit configured to image an imaging surface of a recognition target; a reflection unit disposed to reflect another imaging surface of the recognition target to the imaging unit; and a recognition unit configured to recognize the recognition target on the basis of a first image of the one imaging surface and a second image of the other imaging surface.

Advantageous Effects of Invention

According to the present disclosure, it is possible to accurately recognize a recognition target.

BRIEF DESCRIPTION OF DRAWINGS

FIG. 5 is a diagram illustrating a specific example of a determination table 103*a*.

DESCRIPTION OF EMBODIMENTS

An embodiment of the present disclosure will be described below with reference to the accompanying drawings. As much as possible, the same constituents will be referred to by the same reference signs, and repeated description will be omitted.

Figure 1:
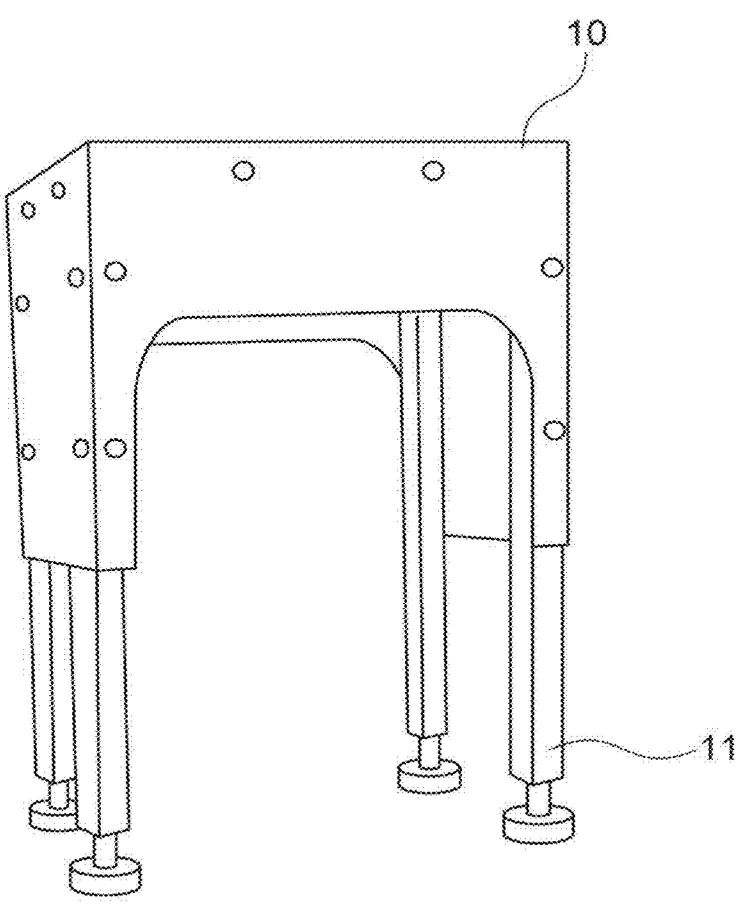
FIG. 1 is a diagram illustrating the appearance of an image recognition device 10 according to the present disclosure.

FIG. 1 is a diagram illustrating the appearance of an image recognition device 10 according to the present disclosure. As illustrated in the drawing, the image recognition device 10 includes four legs 11 and is configured to enable a belt conveyor for conveying a recognition target to pass between the legs 11. The legs 11 are configured to be telescopic. In the drawing, the legs 11 are in a stretched state, and the legs 11 of the image recognition device 10 are set to positions based on the size of a recognition target at the time of recognition of the recognition target. In the present disclosure, crops such as vegetables are assumed as an example of the recognition target, and the present disclosure is not limited thereto, and fishes and shellfishes and natural objects without fixed sizes may be used as the recognition target. Examples of the recognition target include dead or living animals. Examples of the recognition target include artificial objects (products). Regarding the artificial objects (products), the artificial objects are counted and a damaged state thereof is detected by recognizing a package of the artificial objects (products).

Figure 2:
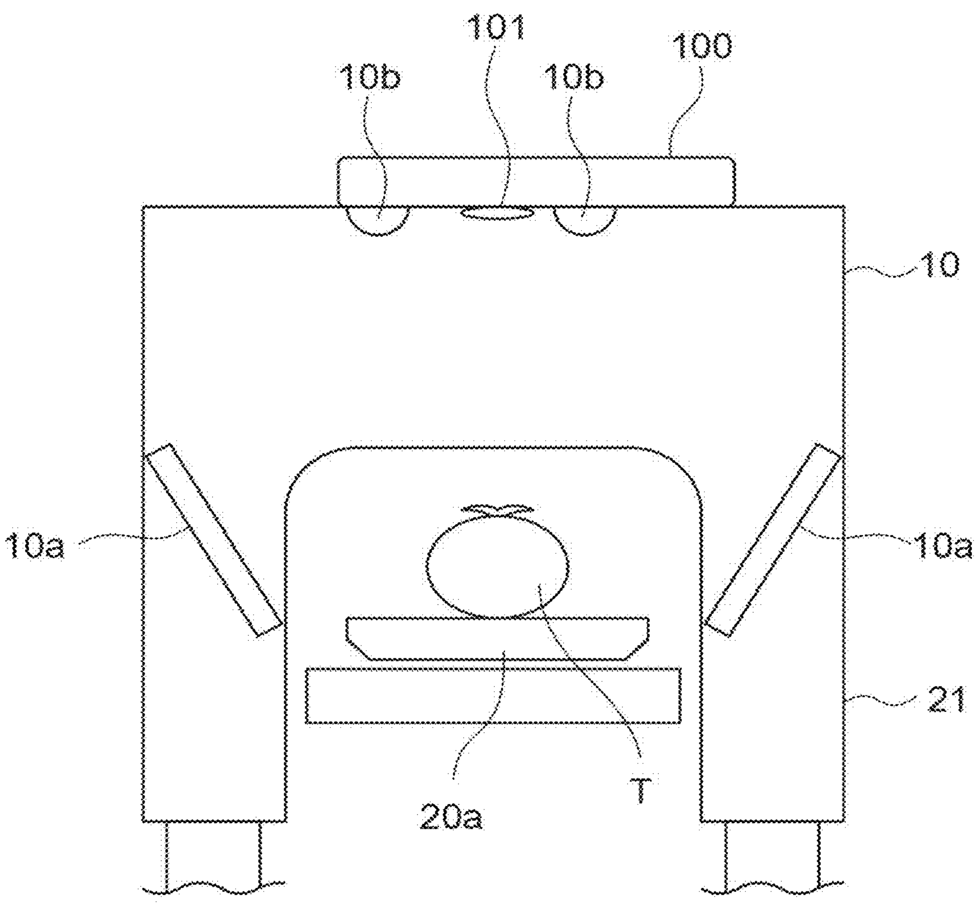
FIG. 2 is a diagram illustrating a sectional view of the image recognition device 10 according to the present disclosure seen in a carrying direction.

FIG. 2 is a diagram illustrating a sectional view of the image recognition device 10 according to the present disclosure seen in a carrying direction. As illustrated in the drawing, an imaging device 100 such as a smartphone is mounted on the top surface of the image recognition device 10. An illumination unit 11*a* is provided inside of the top surface of the image recognition device 10. The illumination unit 11*a* illuminates a recognition target which is imaged by the imaging device 100 (a camera 101).

In the present disclosure, mirror units 10*a* and 10*b* are provided in the vicinity of a recognition target T (a conveyor 21) and are tilted to enable imaging of side surfaces of the recognition target T from above. That is, the mirror units 10*a* and 10*b* are provided to reflect the side surfaces of the recognition target T upward. In the present disclosure, two mirror units including the mirror units 10*a* and 10*b* are provided, but only one mirror unit 10*a* may be provided or three or more mirror units may be provided.

The conveyor 21 is a part that carries a recognition target T. In the present disclosure, the conveyor 21 is a tray type conveyor and carries a recognition target T on a tray 20*a*. The mirror units 10*a* are provided on both lateral sides (or one lateral side) in a carrying direction of the conveyor 21.

Figure 3:
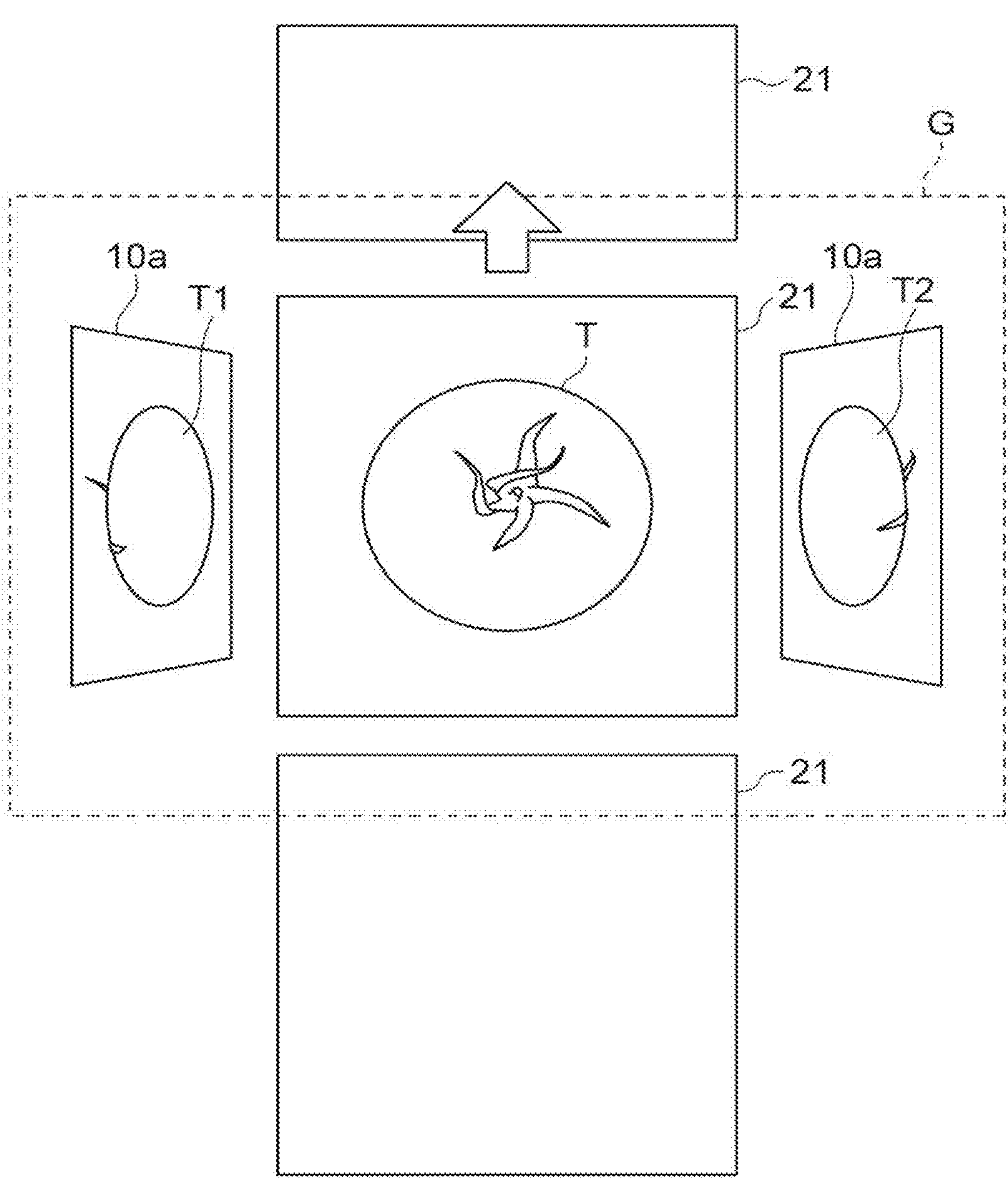
FIG. 3 is a diagram illustrating a recognition screen G including a recognition target T and a pair of mirror units 10*a* on the right and left sides at the time of capturing an image.

FIG. 3 is a diagram illustrating a recognition screen G including a recognition target T and a pair of mirror units 10*a* on the right and left sides at the time of capturing an image. As illustrated in the drawing, the right side surface and the left side surface of the recognition target T are reflected in the pair of mirror units 10*a* on the right side and the left side. The imaging device 100 can acquire a recognition screen G by imaging a right side surface T1 (a side surface image) and a left side surface T2 (a side surface image) of the recognition target T and a top surface (a top image) of the recognition target T. The imaging device 100 can recognize a type, a size, and the like of the recognition target T on the basis of the images.

Figure 4:
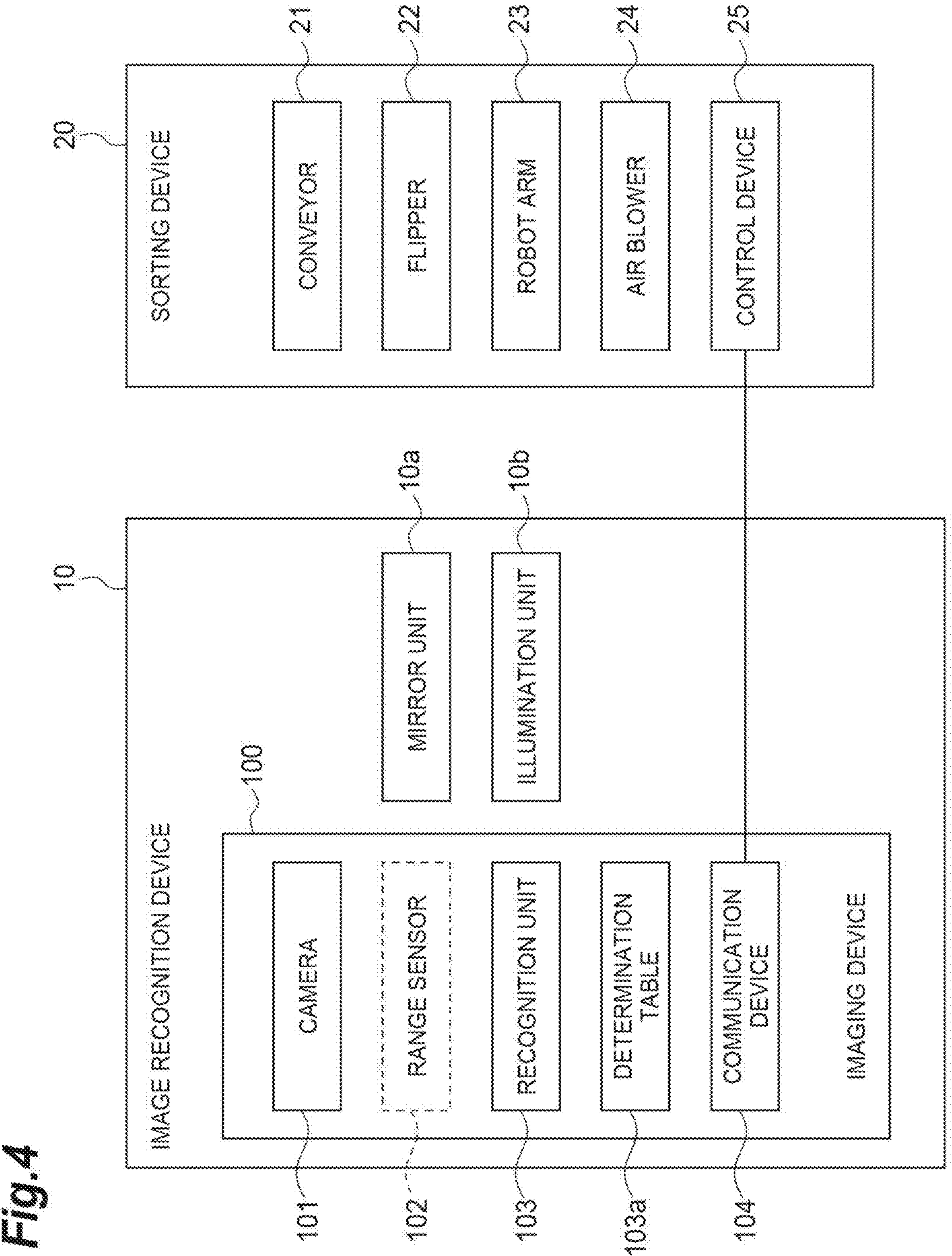
FIG. 4 is a diagram illustrating functional configurations of the image recognition device 10 and a sorting device 20.

FIG. 4 is a diagram illustrating functional configurations of the image recognition device 10 and a sorting device 20. As illustrated in the drawing, the image recognition device 10 includes an imaging device 100, a mirror unit 10*a*, and an illumination unit 10*b*. The imaging device 100 includes a camera 101 (an imaging unit), a range sensor 102, a recognition unit 103, and a communication device 104.

In the present disclosure, an image recognizing process is performed using one computer, but the present disclosure is not limited thereto. When high-speed communication such as a 5-th generation mobile communication system called 5th Generation (5G) or fiber to the home (FTTH) can be used, capturing an image may be performed by a terminal (locally), the captured image may be transmitted to a cloud server over a network, and an inference and recognition process of AI may be performed by the cloud server.

The camera 101 is a part that acquires a top image and a side image which are obtained by imaging the top surface of the recognition target T and the side surfaces reflected by the mirror units 10*a*. As illustrated in FIG. 3, the camera 101 acquires the recognition screen G.

The range sensor 102 is a part that measures a distance to the recognition target T. The range sensor 102 is not an essential constituent as will be described later.

The recognition unit 103 is a part that recognizes a type and a size of the recognition target on the basis of the top image and the side image included in the recognition screen G and acquires recognition result information including the size. More specifically, first, the recognition unit 103 acquires the top image and the side image of the recognition target T in a predetermined region in the recognition screen G. Then, the recognition unit 103 recognizes the type of the recognition target T and a score (recognition accuracy) thereof from the top image and the side image of the recognition target T. For example, image recognition is performed using known AI (an estimation model), and information indicating a tomato and a score thereof are calculated.

The recognition unit 103 selects one recognition result of the top surface and the side surface, and preferably selects the recognition result with a higher score.

Top images and side images of recognition targets including the recognition target T are learned in advance, and an estimation model is constructed. In image recognition (object detection) technology, frame coordinates (left-upper: x1, y1) to (right-lower: x2, y2), a label, and a score (recognition accuracy) thereof are output. The label indicates a recognition result of a recognition target T and indicates a recognition result (a type) included in the top image or the side image in the present disclosure.

The recognition unit 103 determines one determination table 103*a* on the basis of the type of the recognition target T based on the top image and the side image. That is, the determination table 103*a* is prepared for each type, and the recognition unit 103 determines a determination table 103*a* on the basis of a score (for example, a highest score) of the recognition result of the top image and the side image. When the score is equal to or less than a predetermined value or has a predetermined recognition accuracy is not satisfied, a recognition error may be determined.

The recognition unit 103 acquires lengths (the numbers of pixels) in the X, Y, and Z direction from the top image and the side image in the recognition screen G. Then, the recognition unit 103 recognizes a size with reference to the determination table 103*a* on the basis of the lengths and acquires the recognized size as the recognition result information.

The recognition result information is not limited to a size, and a volume, a shape, other outer shapes (whether there is a scratch) of the recognition target, or a score indicating a recognition accuracy thereof may be used, or all thereof may be used.

The determination table 103*a* is a table in which the lengths in the X, Y, and Z directions of the recognition target T are correlated with the size of the recognition target T. In the present disclosure, the determination table 103*a* is prepared for each type of the recognition target T. For example, the determination table 103*a* is prepared for each type of crops (such as tomatoes).

In the determination table 103*a*, an X*Y range (a range of multiplication of X by Y), an X*Z range (a range of multiplication of X by Z), and an X*Y*Z range (a range of multiplication of X by Y by Z) are correlated with a size. FIG. 5 is a diagram illustrating a specific example thereof. In FIG. 5, numerical values represent the numbers of pixels, but the present disclosure is not limited thereto, and the numerical values may represent lengths in the unit of millimeter (mm) in the real world from the numbers of pixels.

The X*Y range represents an area when seen from above, and the X*Y*Z range represents a volume. In the drawing, sizes S, M, and L are clearly illustrated, but the present disclosure is not limited thereto, and the size may be subdivided into SS (which is smaller than S), LL (which is larger than L), and the like.

Values of the ranges represented by calculational expressions of X, Y, and Z in the drawing are only examples and change according to a crop type and a sorting length. Accordingly, when the determination table 103*a* is prepared, measurement data is collected and the ranges are determined.

When the recognition unit 103 cannot recognize any numerical values of X, Y, and Z, any score of the top image and the side image may not reach a predetermined value. For example, this may occur when the camera 101 fails to capture a side image. This may occur in a case in which timings of carrying and imaging of the recognition target T are different or installation positions of the mirror units 10*a* are not appropriate.

When the score is low, this means that the image has features different from learning images used to prepare the estimation model. For example, this may occur when an estimation model trained using red tomatoes is prepared, and a tomato in a sorting facility which is greenish is recognized using the estimation model or a thin tomato is recognized using an estimation model trained using round tomatoes. When features are far away from each other, a recognition target may not be recognized and the score may be low.

In addition, when ambient light infiltrates at the time of recognition and a color temperature changes or the recognition target appears shining and thus contrast or color tone changes, the same may occur in the image thereof and thus the score may decrease.

With these circumstances, the recognition unit 103 derives the size with reference to the determination table 103*a* using the lengths (any two of the lengths in the X, Y, and Z directions) based on the top image or the side image acquired with a score equal to or greater than a predetermined value. That is, the recognition unit 103 uses only X and Y or only X and Z. The recognition unit 103 may use only Y and Z. The accuracy in the X*Y range and the X*Z range is handled as a low level, and the accuracy in the X*Y*Z range is handled as a high level.

When the accuracy is at a low level, there is an effect of preventing omission when counting a number. By giving accuracy information, the recognition unit 103 can be used for the sorting device 20. For example, the sorting device 20 may sort recognition targets with a low accuracy into a different frame on the basis of the accuracy information, and an operator may be separately made to determine the recognition targets.

Since there is a likelihood that an image (a frame thereof) may not be captured for some reason or may not be recognized only at the moment at which the accuracy becomes lower (there is a surface which cannot be imaged) at the time of image analysis, the recognition unit 103 may search the past or future frames of a video of the camera 101 stored in a buffer memory (not illustrated), retrieve a recognizable frame (a frame with a score equal to or greater than a predetermined value), replace or complement information, and acquire a recognition result with a high accuracy. In this case, the camera 101 has a function of capturing several tens of images per second and a function of being able to perform analysis in real time.

The numerical values in the ranges indicating the numbers of pixels in the determination table 103*a* are examples and change according to crop types and sorting spots, and thus the ranges are determined by collecting measured data. The determination table 103*a* may be constructed using a supervised model such as a support vector machine (SVM) subjected to machine learning by collecting a large amount of numerical data in the X, Y, and Z axes and using the sizes as answer labels. This model may be used instead of the determination table 103*a*.

The communication device 104 is a part that transmits the recognition result information including a type and a size of a recognition target to the sorting device 20.

The sorting device 20 includes a conveyor 21, a flipper 22, a robot arm 23, an air blower 24, and a control device 25.

The conveyor 21 is a carrying means that carries a recognition target T in a predetermined carrying direction.

The flipper 22 is a member for changing the carrying direction of a recognition target T carried on the conveyor 21 and discharging the recognition target from the conveyor 21.

The robot arm 23 is an arm member for lifting a recognition target T carried on the conveyor and discharging the recognition target from the conveyor 21.

The air blower 24 is a mechanism that discharges a recognition target T from the conveyor 21 by blowing air to a recognition target T carried on the conveyor 21.

The control device 25 is a device that controls the flipper 22, the robot arm 23, and the air blower 24 on the basis of the recognition result information of the recognition target transmitted from the imaging device 100. All of the flipper 22, the robot arm 23, and the air blower 24 are not essential constituents, and one thereof may be used or another sorting means may be used. As described above, the control device 25 may control a recognition target T of the recognition result information with a low accuracy such that the recognition target is discharged from the carrying path using the flipper 22 or the like to be reexamined.

The image recognition device 10 transmits the recognition result information including the type, the size, and the like of the recognition target T to the sorting device 20, and the sorting device 20 performs a sorting process on the basis of the recognition result information.

Figure 6:
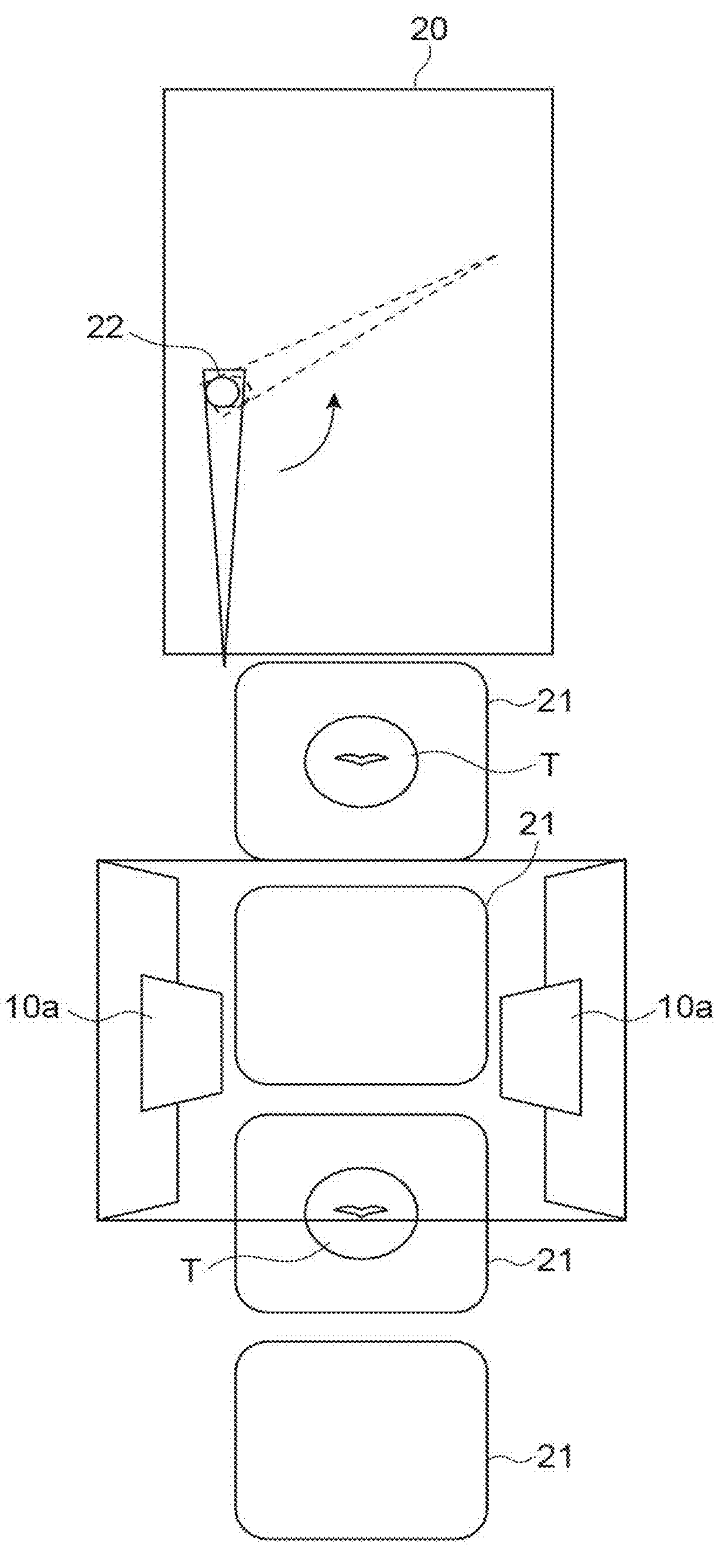
FIG. 6 is a diagram illustrating a sorting mechanism using a flipper 22.

FIG. 6 is a diagram illustrating a sorting mechanism using the flipper 22. As illustrated in the drawing, a recognition target T carried on the conveyor 21 which is a tray type conveyor is discharged from the conveyor 21 by causing the flipper 22 to occupy the carrying path. In the drawing, the flipper 22 is illustrated as performing only one of an operation of discharging a recognition target from the conveyor 21 and an operation of not discharging the recognition target from the conveyor 21, but a plurality of sorting operations may be performed using a plurality of flippers 22.

Figure 7:
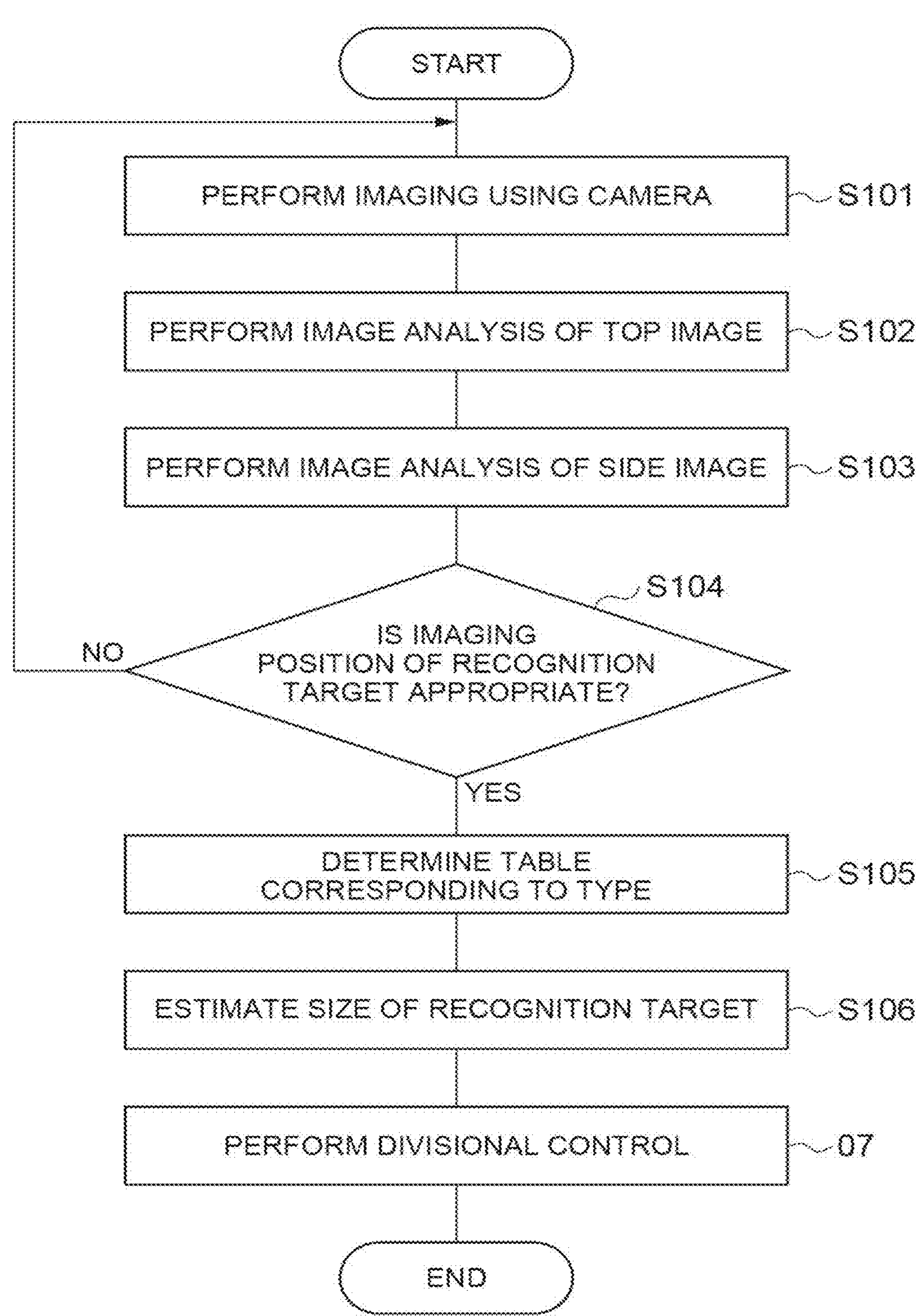
FIG. 7 is a flowchart illustrating operations of the image recognition device 10 according to the present disclosure.

FIG. 7 is a flowchart illustrating operations of the image recognition device 10 according to the present disclosure. The camera 101 images a recognition target T (S101), and the recognition unit 103 analyzes a top image and a side image of the recognition target T and calculates a type, lengths X, Y, and Z, and a score of the recognition target T (S102 and S103).

Then, the recognition unit 103 determines whether an imaging position of the recognition target T is appropriate (S104). For example, when the recognition target T can be recognized normally (with a score equal to or greater than a predetermined value) (for example, when the entire recognition target are included in a video), the recognition unit 103 determines that the imaging position is appropriate. Without limitation thereto, whether the imaging position is appropriate may be determined using other methods. These methods will be described later.

When it is determined that the imaging position is not appropriate, the processes of S101 to S103 are repeatedly performed until a recognition target reaches an appropriate position.

When it is determined that the imaging position is appropriate, the recognition unit 103 determines the determination table 103*a* on the basis of the type and the score of the recognition target T through image analysis of the top image and image analysis of the side image (S105).

Then, the recognition unit 103 estimates the size of the recognition target T with reference to the determination table 103*a* (S106). The communication device 104 transmits the estimated size of the recognition target T to the sorting device 20.

The sorting device 20 performs divisional control on the basis of the transmitted size (S107). As described above, the control device 25 controls whether to discharge the recognition target from the carrying path of the conveyor 21 by operating the flipper 22 or the like. As described above, the control object is not limited to the flipper 22, but another sorting means may be controlled.

Figure 8:
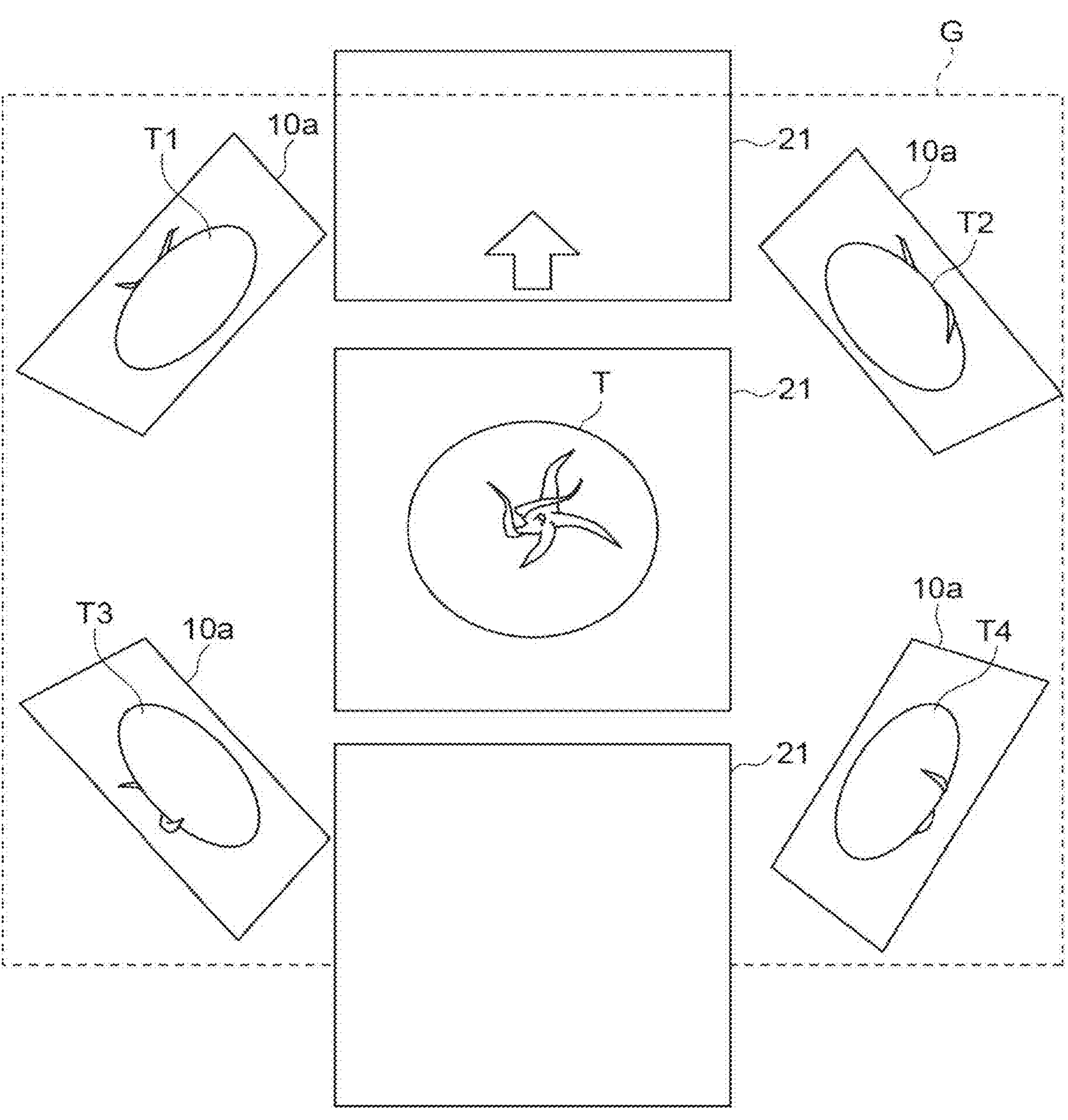
FIG. 8 is a diagram illustrating a recognition screen G including a recognition target T and four mirror units 10*a* at the time of capturing an image.

In the present disclosure, the number of mirror units 10*a* is two, but the present disclosure is not limited thereto. For example, as illustrated in FIG. 8, the recognition unit 103 may perform an image recognizing process using four mirror units 10*a*. It is possible to enhance the accuracy of the image recognition using more mirror units 10*a*. In FIG. 8, the mirror unit 10*a* is disposed at each corner of a tray 20*a*. Accordingly, the mirror units 10*a* can be disposed without interfering with the carrying path of the tray 20*a*. It is possible to ascertain the side surfaces of the recognition target T up to the corners and to acquire a recognition result with a high accuracy. The number of mirror units 10*a* is not limited to four, and more mirror units may be used. When a plurality of mirror units 10*a* are disposed in a belt conveyor type, it is preferable that the mirror units be disposed on both lateral sides of the carrying direction and upstream and downstream in the carrying direction.

Figure 9:
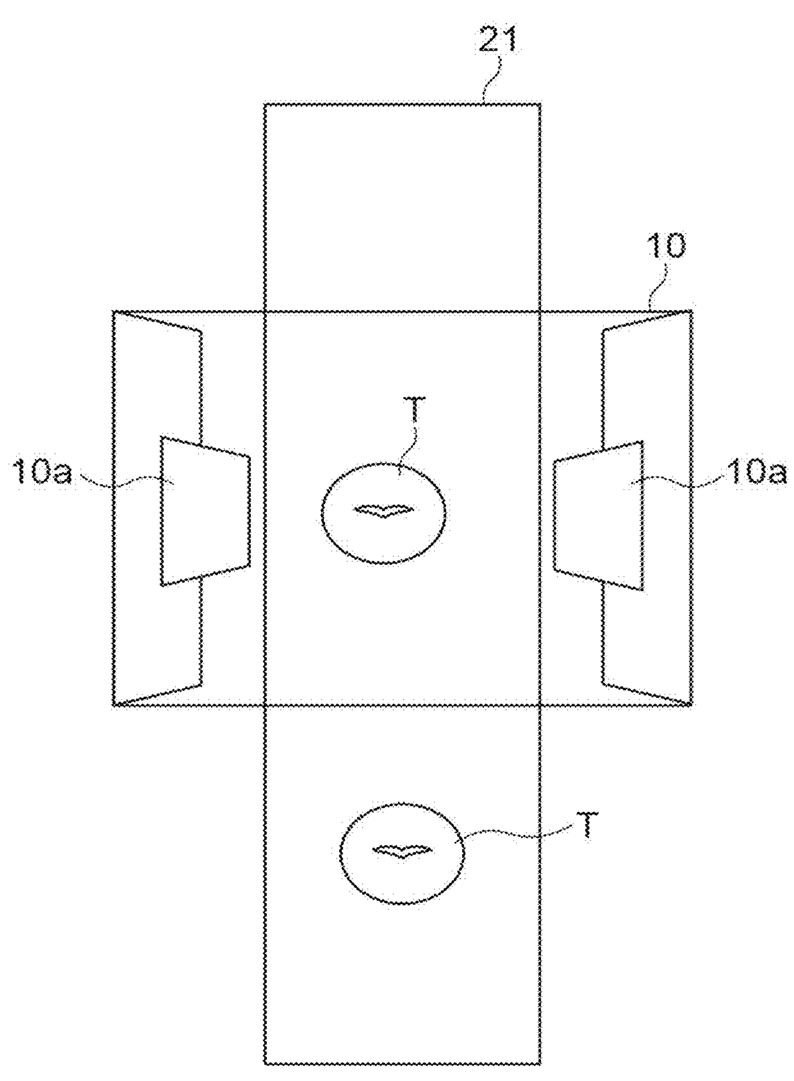
FIG. 9 is a diagram illustrating another example of a conveyor 21.

FIG. 9 is a diagram illustrating another example of the conveyor 21. The image recognition device 10 according to the present disclosure can be applied to a belt conveyor type instead of a tray type. In addition, an object that can move autonomously may be used as a recognition target without using a tray or a belt conveyor. For example, an object that can pass through an imaging point without power such as an animal or a vehicle may be used as a recognition target. In this case, the conveyor or the like is unnecessary. In this case, a housing part (an imaging box) of the image recognition device 10 can be formed in a big size and can be applied to recognition of animals passing through an entrance of a farm, recognition of vehicles passing through a passage in a parking lot, and the like.

Figure 10:
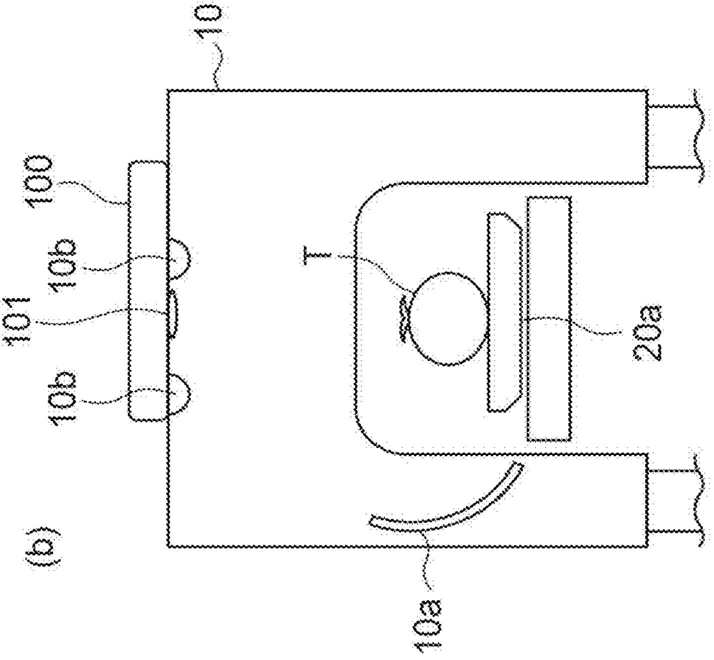
FIG. 10 is a diagram illustrating another example of a mirror unit 10*a*.
Figure 10:
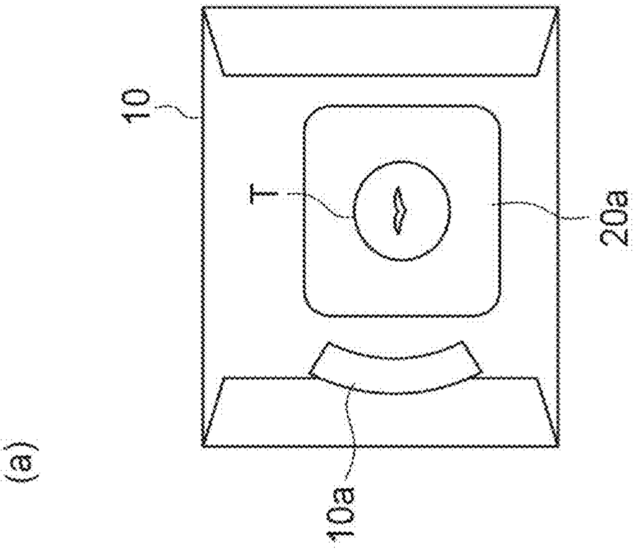

FIG. 10 is a diagram illustrating another example of the mirror unit 10*a*, where FIG. 10(*a*) is a top view of the image recognition device 10 and FIG. 10(*b*) is a side view of the image recognition device 10. As illustrated in the drawing, the mirror unit 10*a* may be formed in a curved shape, and the wide range near the recognition target T may be imaged. In the drawing, the mirror unit 10*a* is curved inward as a concave mirror.

The concave mirror widely reflects an object to surround a side surface of an object at a specific position (an imaging position of an object), and thus an imaging area for a target object is large, and the target object is reflected in an enlarged size. Accordingly, there is a merit that a scratch or the like can be easily detected.

Figure 11:
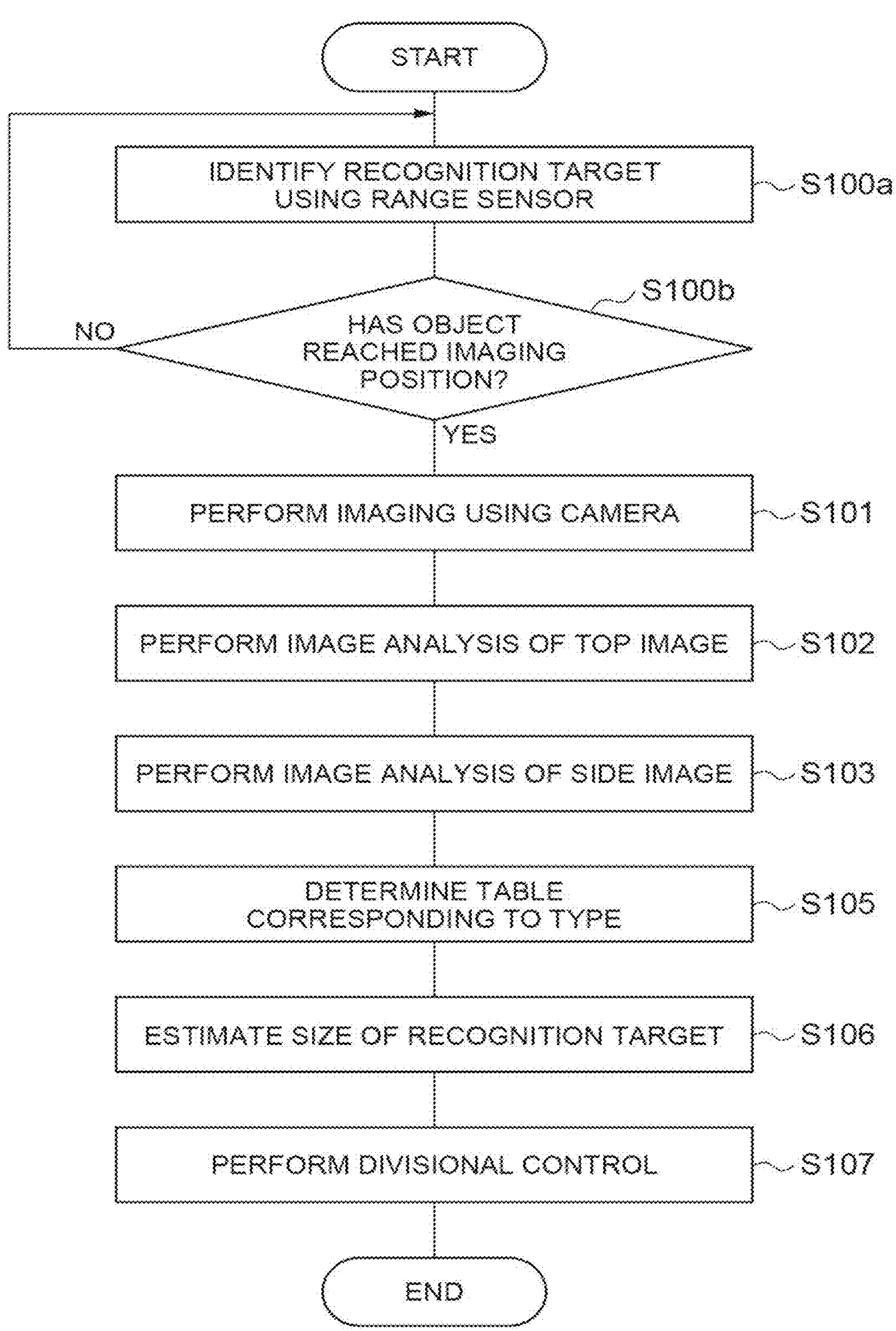
FIG. 11 is a flowchart illustrating operations of the image recognition device 10 using a range sensor 102.

FIG. 11 is a flowchart illustrating operations of the image recognition device 10 including determining whether a recognition target T is located at an appropriate imaging position using the range sensor 102.

As illustrated in the drawing, the range sensor 102 identifies a position of a recognition target T (S100*a*). The range sensor 102 is provided above the imaging position, and a distance therebetween is the shortest when the recognition target T reaches the imaging position. The range sensor 102 determines whether the recognition target T has reached the imaging position on the basis of the distance therebetween. The camera 101 images the recognition target T on the basis of a result of determination, and the recognition unit 103 performs image analysis of the captured image.

The processes subsequent thereto are the same as illustrated in FIG. 7 except S104. That is, the camera 101 images the recognition target T, and the recognition unit 103 performs image analysis and acquires the type and the lengths X, Y, and Z of the recognition target T (S101 to S107).

Figure 12:
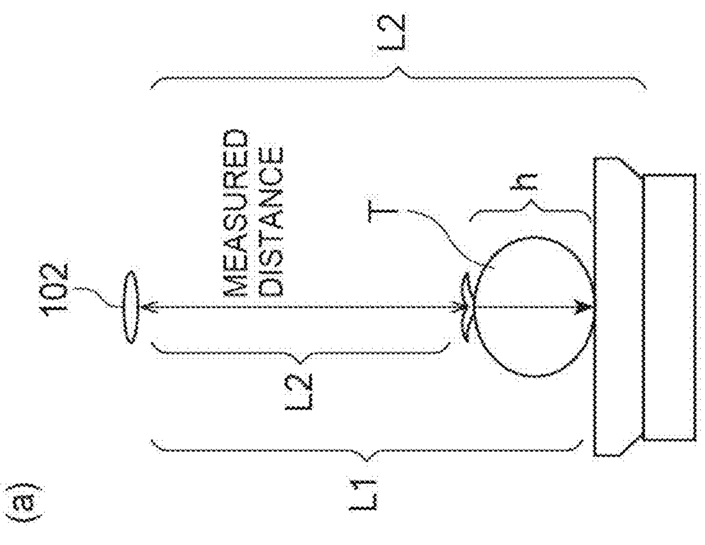
FIG. 12 is a diagram schematically illustrating a graph of transition of a sensor value from the range sensor 102 and the sensor values.
Figure 12:
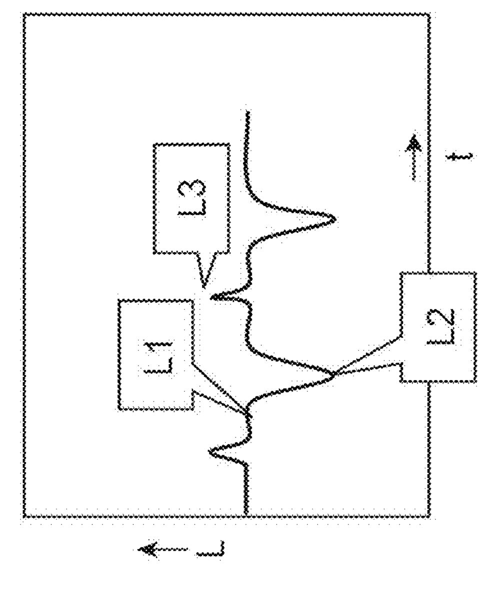

FIG. 12 is a diagram schematically illustrating a transition graph of a sensor value from the range sensor 102 and the sensor value. As illustrated in FIG. 12(*a*), a sensor value L1 represents a distance from the range sensor 102 to a tray, a sensor value L2 represents a distance from the range sensor 102 to a top of the recognition target T, and a sensor value L3 represents a distance from the range sensor 102 to a joint of the tray. FIG. 12(*b*) is a transition graph of the sensor value when a tray having the recognition target T mounted thereon is carried. When a position indicated by L2 in the graph is the top of the recognition target T and the range sensor 102 detects the top, imaging using the camera 101 and image analysis using the recognition unit 103 are performed.

By using the range sensor 102, an imaging process using the camera 101 and an image analyzing process using the recognition unit 103 are performed one time for each recognition target. Such processes can be used in a device with low specifications or the like such as a CPU constituting the recognition unit 103 or the like.

Operational advantages of the image recognition device 10 according to the present disclosure will be described below. The image recognition device 10 according to the present disclosure includes the imaging device 100 configured to image one imaging surface (for example, a top surface) of a recognition target T, the mirror unit 10*a* that is a reflection unit disposed to reflect another imaging surface (for example, a side surface) of the recognition target T to the imaging device 100, and the recognition unit 103 configured to recognize the recognition target T on the basis of a first image of the one imaging surface (the top surface) and a second image of the other imaging surface (the side surface).

With this configuration, it is possible to obtain images of surfaces at a plurality of positions such as side surfaces of a recognition target through one imaging operation and to improve the recognition accuracy of a recognition target. Even when a recognition target has been rolled and placed, the recognition target can be imaged in at least two directions, and thus it is possible to improve the recognition accuracy. It is also possible to achieve a secondary advantageous effect of being able to count the number of recognition targets T.

In the present disclosure, the recognition unit 130 of the imaging device 100 can recognize a size of a recognition target T.

For example, the image recognition device 10 according to the present disclosure further includes a determination table 103*a* for defining a size based on lengths in at least two of a longitudinal direction, a lateral direction, and a height direction of the recognition target T. The recognition unit 103 recognizes lengths in the longitudinal direction, the lateral direction, and the height direction of the recognition target T based on the first image (for example, a top image) and the second image (for example, a side image) which are captured images of the recognition target and recognizes the size of the recognition target T with reference to the determination table 103*a*.

Accordingly, it is possible to perform size sorting with a high accuracy. For example, since crops such as tomato are uneven in height not in sphere, the same type of tomato may have a flat shape and a thin shape. Accordingly, when it is intended to determine the size/grade on the basis of a volume and a weight and there is no information in three directions including the height direction, there is a problem in that erroneous sorting is performed due to unevenness in height of crops. With the image recognition device 10 according to the present disclosure, it is possible to prevent such erroneous sorting. In the image recognition device 10 according to the present disclosure, the determination table 103*a* defines a size of each type of the recognition target T. The recognition unit 103 recognizes a type of the recognition target T and recognizes the size of the recognition target T with reference to the determination table 130*a* corresponding to the type.

For example, the recognition unit 103 selects the determination table 103*a* for tomato when tomato is recognized. Since the sense of size differs according to the types, the determination table 103*a* for each type is preferably prepared.

In the image recognition device 10 according to the present disclosure, the determination table 103*a* defines a combination of two of the lengths in the longitudinal direction, the lateral direction, and the height direction as a size with a low accuracy and defines a combination of all the lengths in the longitudinal direction, the lateral direction, and the height direction as sizes with high accuracy. For example, a combination of the X*Y range (a range in the longitudinal and lateral directions) and the X*Z range (a range in the lateral and height directions) is set to a low accuracy.

The recognition unit 103 selects one or more recognized lengths in the longitudinal direction, the lateral direction, and the height direction on the basis of recognition scores thereof with reference to the determination table 103*a*.

For example, a recognition score is a score indicating a recognition accuracy in image recognition and is calculated using known techniques. The recognition unit 103 does not employ the length of an image with a recognition score indicating a low recognition accuracy using the recognition scores. Accordingly, it is possible to derive a size with a low accuracy and high reliability. For example, when the recognition accuracy of a top image is low and the recognition accuracy of a side image is high, the recognition result of the side image is used.

In the image recognition device 10 according to the present disclosure, the recognition unit 103 recognizes the recognition target on the basis of a recognition score in at least one of the first image (for example, the top image) and the second image (for example, the side image). As described above, since the recognition score indicates the recognition accuracy, it is preferable to recognize the recognition target on the basis of an image with a recognition score indicating a high recognition accuracy (one or both of the first image and the second image).

For example, when it is determined that the recognition score of the top image of the recognition target T is low and low reliability and the recognition score of the side image is high, the recognition unit 103 can recognize the size or the like of the recognition target T using the side image. Accordingly, even when the recognition target T adopts any posture (for example, is laid), it is possible to accurately recognize the size thereof.

In the image recognition device 10 according to the present disclosure, the mirror unit 10*a* includes at least two reflection units. The mirror units 10*a* are provided in the vicinity of the recognition target T. The vicinity is, for example, the vicinity of a carrying path of the recognition target T. The two reflection units 10*a* are provided to reflect different second images (for example, the side images on the right and left sides) of the recognition target T to the imaging device 100.

The recognition unit 103 selects one second image (the side image on the right or left side) on the basis of recognition scores of the second images (the side images on the right and left sides) of the at least two mirror units 10*a*. The recognition unit 103 recognizes the recognition target T on the basis of the selected one second image (the side image on the right or left side).

In the present disclosure, the recognition target T is carried along the conveyor 21 which is installed in advance. The imaging device 100 is provided at a position at which one imaging surface (for example, the top image) of the recognition target T carried along the conveyor 21 is imaged. The mirror unit 10*a* is provided at a position at which another imaging surface (the side surface) of the recognition target T is imaged.

In the present disclosure, the camera 101 acquires the top image by imaging the top surface of the recognition target T without using a mirror or the like and acquires the side image by reflecting the side surface of the recognition target T using the mirror unit 10*a*, but the present disclosure is not limited thereto. The side image may be directly acquired by imaging the recognition target in the lateral direction using the camera 101, and the top image may be acquired by reflecting the top surface using a mirror or the like.

A plurality of mirror units 10*a* may be provided at positions which are opposite with respect to the recognition target T.

Since the mirror units are located at the opposite positions, it is possible to image the recognition target in the opposite directions and to acquire images from different viewpoints. Accordingly, it is possible to improve the accuracy of image recognition.

In the present disclosure, a focus is put on recognition of a size of a recognition target T, but the present disclosure is not limited thereto. Subtle differences in appearance (such as tint or tone), a shape, a scratch, or the like may be acquired as the recognition result of the recognition target T. Artificial objects such as products or product packages have no difference in appearance or size, but may have scratches in the manufacturing process thereof, and the image recognition device 10 according to the present disclosure can also be applied to recognition of scratches of such products.

The image recognition device 10 according to the present disclosure employs the following configurations.

[1] An image recognition device including:

- an imaging unit configured to image one imaging surface of a recognition target;
- a reflection unit disposed to reflect another imaging surface of the recognition target to the imaging unit; and
- a recognition unit configured to recognize the recognition target on the basis of a first image of the one imaging surface and a second image of the other imaging surface.

[2] The image recognition device according to [1], wherein the recognition unit recognizes a size of the recognition target.

[3] The image recognition device according to [2], further including a determination table for defining a size based on lengths in at least two of a longitudinal direction, a lateral direction, and a height direction of the recognition target,

- wherein the recognition unit recognizes the lengths in the longitudinal direction, the lateral direction, and the height direction of the recognition target based on the first image and the second image and recognizes the size of the recognition target with reference to the determination table.

[4] The image recognition device according to [3], wherein the determination table defines a size of each type of the recognition target, and

- wherein the recognition unit recognizes a type of the recognition target and recognizes the size of the recognition target with reference to the determination table corresponding to the type.

[4] The image recognition device according to [1], wherein the determination table additionally defines a combination of two of the lengths in the longitudinal direction, the lateral direction, and the height direction as a size with a low accuracy and defines a combination of all the lengths in the longitudinal direction, the lateral direction, and the height direction as sizes with high accuracy, and wherein the recognition unit refers to the determination table on the basis of the recognized lengths in the directions.

[6] The image recognition device according to any one of [1] to [5], wherein the recognition unit recognizes the recognition target on the basis of a recognition score in at least one of the first image and the second image.

[7] The image recognition device according to any one of [1] to [6], wherein the reflection unit includes at least two reflection units, wherein the at least two reflection units are provided in the vicinity of the recognition target, and wherein the at least two reflection units are provided to reflect different second images of the recognition target to the imaging unit.

[8] The image recognition device according to [7], wherein the recognition unit selects one second image on the basis of recognition scores of the second images of the at least two reflection units and recognizes the recognition target on the basis of the selected one second image.

[9] The image recognition device according to [8], wherein the reflection units are provided at positions which face each other with respect to the recognition target.

[10] The image recognition device according to any one of [1] to [9], wherein the recognition target is carried along a carrying path which is installed in advance, wherein the imaging unit is provided at a position at which one imaging surface of the recognition target carried along the carrying path is imaged, and wherein the reflection unit is provided at a position at which another imaging surface of the recognition target is imaged.

The block diagram used for the description of the above embodiments shows blocks of functions. Those functional blocks (component parts) are implemented by any combination of at least one of hardware and software. Further, a means of implementing each functional block is not particularly limited. Specifically, each functional block may be implemented by one physically or logically combined device or may be implemented by two or more physically or logically separated devices that are directly or indirectly connected (e.g., by using wired or wireless connection etc.). The functional blocks may be implemented by combining software with the above-described one device or the above-described plurality of devices.

The functions include determining, deciding, judging, calculating, computing, processing, deriving, investigating, looking up/searching/inquiring, ascertaining, receiving, transmitting, outputting, accessing, resolving, selecting, choosing, establishing, comparing, assuming, expecting, considering, broadcasting, notifying, communicating, forwarding, configuring, reconfiguring, allocating/mapping, assigning and the like, though not limited thereto. For example, the functional block (component part) that implements the function of transmitting is referred to as a transmitting unit or a transmitter. In any case, a means of implementation is not particularly limited as described above.

Figure 13:
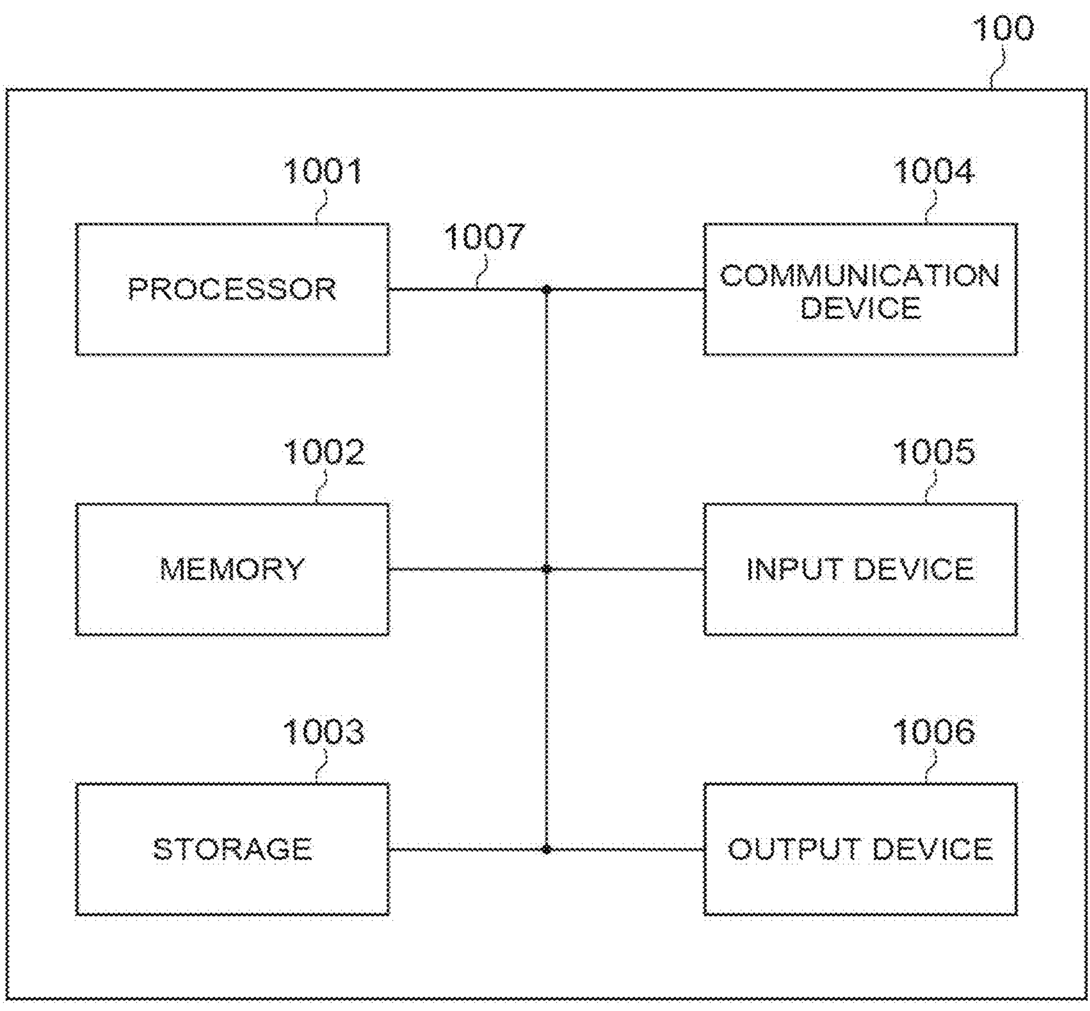
FIG. 13 is a diagram illustrating an example of a hardware configuration of an imaging device 100 according to an embodiment of the present disclosure.

For example, the imaging device 100 in the image recognition device 10 and the like according to one embodiment of the present disclosure may function as a computer that performs processing of an image recognition method according to the present disclosure. FIG. 13 is a view showing an example of the hardware configuration of the imaging device 100 according to one embodiment of the present disclosure. The imaging device 100 described above may be physically configured as a computer device that includes a processor 1001, a memory 1002, a storage 1003, a communication device 1004, an input device 1005, an output device 1006, a bus 1007 and the like.

In the following description, the term "device" may be replaced with a circuit, a device, a unit, or the like. The hardware configuration of the imaging device 100 may be configured to include one or a plurality of the devices shown in the drawings or may be configured without including some of those devices.

The functions of the imaging device 100 may be implemented by loading predetermined software (programs) on hardware such as the processor 1001 and the memory 1002, so that the processor 1001 performs computations to control communications by the communication device 1004 and control at least one of reading and writing of data in the memory 1002 and the storage 1003.

The processor 1001 may, for example, operate an operating system to control the entire computer. The processor 1001 may be configured to include a CPU (Central Processing Unit) including an interface with a peripheral device, a control device, an arithmetic device, a register and the like. For example, the recognition unit 103 and the like described above may be implemented by the processor 1001.

Further, the processor 1001 loads a program (program code), a software module and data from at least one of the storage 1003 and the communication device 1004 into the memory 1002 and performs various processing according to them. As the program, a program that causes a computer to execute at least some of the operations described in the above embodiments is used. For example, recognition unit 103, the search unit 103, and the conversation information generation unit 104 of the conversation device 100 may be implemented by a control program that is stored in the memory 1002 and operates on the processor 1001, and the other functional blocks may be implemented in the same way. Although the above-described processing is executed by one processor 1001 in the above description, the processing may be executed simultaneously or sequentially by two or more processors 1001. The processor 1001 may be implemented in one or more chips. Note that the program may be transmitted from a network through a telecommunications line.

The memory 1002 is a computer-readable recording medium, and it may be composed of at least one of ROM (Read Only Memory), EPROM (ErasableProgrammable ROM), EEPROM (Electrically ErasableProgrammable ROM), RAM (Random Access Memory) and the like, for example. The memory 1002 may be also called a register, a cache, a main memory (main storage device) or the like. The memory 1002 can store a program (program code), a software module and the like that can be executed for implementing an image recognition method according to one embodiment of the present disclosure.

The storage 1003 is a computer-readable recording medium, and it may be composed of at least one of an optical disk such as a CD-ROM (Compact Disk ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark)

disk, a magnetic strip and the like, for example. The storage 1003 may be called an auxiliary storage device. The above-described storage medium may be a database, a server, or another appropriate medium including at least one of the memory 1002 and/or the storage 1003, for example.

The communication device 1004 is hardware (a transmitting and receiving device) for performing communication between computers via at least one of a wired network and a wireless network, and it may also be referred to as a network device, a network controller, a network card, a communication module, or the like. The communication device 1004 may include a high-frequency switch, a duplexer, a filter, a frequency synthesizer or the like in order to implement at least one of FDD (Frequency Division Duplex) and TDD (Time Division Duplex), for example. For example, the above-described communication device 104 may be implemented by the communication device 1004. The communication device 104 may be implemented in such a way that a transmitting unit and a receiving unit are physically or logically separated.

The input device 1005 is an input device (e.g., a keyboard, a mouse, a microphone, a switch, a button, a sensor, etc.) that receives an input from the outside. The output device 1006 is an output device (e.g., a display, a speaker, an LED lamp, etc.) that makes output to the outside. Note that the input device 1005 and the output device 1006 may be integrated (e.g., a touch panel).

In addition, the devices such as the processor 1001 and the memory 1002 are connected by the bus 1007 for communicating information. The bus 1007 may be a single bus or may be composed of different buses between different devices.

Further, the imaging device 100 may include hardware such as a microprocessor, a DSP (Digital Signal Processor), an ASIC (Application Specific Integrated Circuit), a PLD (Programmable Logic Device), and an FPGA (Field Programmable Gate Array), and some or all of the functional blocks may be implemented by the above-described hardware components. For example, the processor 1001 may be implemented with at least one of these hardware components.

Notification of information may be made by another method, not limited to the aspects/embodiments described in the present disclosure. For example, notification of information may be made by physical layer signaling (e.g., DCI (Downlink Control Information), UCI (Uplink Control Information)), upper layer signaling (e.g., RRC (Radio Resource Control) signaling, MAC (Medium Access Control) signaling, annunciation information (MIB (Master Information Block), SIB (System Information Block))), another signal, or a combination of them. Further, RRC signaling may be called an RRC message, and it may be an RRC Connection Setup message, an RRC Connection Reconfiguration message or the like, for example.

The procedure, the sequence, the flowchart and the like in each of the aspects/embodiments described in the present disclosure may be in a different order unless inconsistency arises. For example, for the method described in the present disclosure, elements of various steps are described in an exemplified order, and it is not limited to the specific order described above.

Input/output information or the like may be stored in a specific location (e.g., memory) or managed in a management table. Further, input/output information or the like can be overwritten or updated, or additional data can be written. Output information or the like may be deleted. Input information or the like may be transmitted to another device.

The determination may be made by a value represented by one bit (0 or 1), by a truth-value (Boolean: true or false), or by numerical comparison (e.g., comparison with a specified value).

Each of the aspects/embodiments described in the present disclosure may be used alone, may be used in combination, or may be used by being switched according to the execution. Further, a notification of specified information (e.g., a notification of "being X") is not limited to be made explicitly, and it may be made implicitly (e.g., a notification of the specified information is not made).

Although the present disclosure is described in detail above, it is apparent to those skilled in the art that the present disclosure is not restricted to the embodiments described in this disclosure. The present disclosure can be implemented as a modified and changed form without deviating from the spirit and scope of the present disclosure defined by the appended claims. Accordingly, the description of the present disclosure is given merely by way of illustration and does not have any restrictive meaning to the present disclosure.

Software may be called any of software, firmware, middleware, microcode, hardware description language or another name, and it should be interpreted widely so as to mean an instruction, an instruction set, a code, a code segment, a program code, a program, a sub-program, a software module, an application, a software application, a software package, a routine, a sub-routine, an object, an executable file, a thread of execution, a procedure, a function and the like.

Further, software, instructions and the like may be transmitted and received via a transmission medium. For example, when software is transmitted from a website, a server or another remote source using at least one of wired technology (a coaxial cable, an optical fiber cable, a twisted pair and a digital subscriber line (DSL) etc.) and wireless technology (infrared rays, microwave etc.), at least one of those wired technology and wireless technology are included in the definition of the transmission medium.

The information, signals and the like described in the present disclosure may be represented by any of various different technologies. For example, data, an instruction, a command, information, a signal, a bit, a symbol, a chip and the like that can be referred to in the above description may be represented by a voltage, a current, an electromagnetic wave, a magnetic field or a magnetic particle, an optical field or a photon, or an arbitrary combination of them.

Note that the term described in the present disclosure and the term needed to understand the present disclosure may be replaced by a term having the same or similar meaning. For example, at least one of a channel and a symbol may be a signal (signaling). Further, a signal may be a message. Furthermore, a component carrier (CC) may be called a cell, a frequency carrier, or the like.

Further, information, parameters and the like described in the present disclosure may be represented by an absolute value, a relative value to a specified value, or corresponding different information. For example, radio resources may be indicated by an index.

The names used for the above-described parameters are not definitive in any way. Further, mathematical expressions and the like using those parameters are different from those explicitly disclosed in the present disclosure in some cases. Because various channels (e.g., PUCCH, PDCCH etc.) and information elements (e.g., TPC etc.) can be identified by every appropriate names, various names assigned to such various channels and information elements are not definitive in any way.

In the present disclosure, the terms such as “Mobile Station (MS)” “user terminal”, “User Equipment (UE)” and “terminal” can be used to be compatible with each other.

The mobile station can be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or several other appropriate terms.

Note that the term “determining” and “determining” used in the present disclosure includes a variety of operations. For example, “determining” and “determining” can include regarding the act of judging, calculating, computing, processing, deriving, investigating, looking up/searching/inquiring (e.g., looking up in a table, a database or another data structure), ascertaining or the like as being “determined” and “determined”. Further, “determining” and “determining” can include regarding the act of receiving (e.g., receiving information), transmitting (e.g., transmitting information), inputting, outputting, accessing (e.g., accessing data in a memory) or the like as being “determined” and “determined”. Further, “determining” and “determining” can include regarding the act of resolving, selecting, choosing, establishing, comparing or the like as being “determined” and “determined”. In other words, “determining” and “determining” can include regarding a certain operation as being “determined” and “determined”. Further, “determining (determining)” may be replaced with “assuming”, “expecting”, “considering” and the like.

The term “connected”, “coupled” or every transformation of this term means every direct or indirect connection or coupling between two or more elements, and it includes the case where there are one or more intermediate elements between two elements that are “connected” or “coupled” to each other. The coupling or connection between elements may be physical, logical, or a combination of them. For example, “connect” may be replaced with “access”. When used in the present disclosure, it is considered that two elements are “connected” or “coupled” to each other by using at least one of one or more electric wires, cables, and printed electric connections and, as several non-definitive and non-comprehensive examples, by using electromagnetic energy such as electromagnetic energy having a wavelength of a radio frequency region, a microwave region and an optical (both visible and invisible) region.

The description “on the basis of” used in the present disclosure does not mean “only on the basis of” unless otherwise noted. In other words, the description “on the basis of” means both of “only on the basis of” and “at least on the basis of”.

When the terms such as “first” and “second” are used in the present disclosure, any reference to the element does not limit the amount or order of the elements in general. Those terms can be used in the present disclosure as a convenient way to distinguish between two or more elements. Thus, reference to the first and second elements does not mean that only two elements can be adopted or the first element needs to precede the second element in a certain form.

As long as “include”, “including” and transformation of them are used in the present disclosure, those terms are intended to be comprehensive like the term “comprising”. Further, the term “or” used in the present disclosure is intended not to be exclusive OR.

In the present disclosure, when articles, such as “a”, “an”, and “the” in English, for example, are added by translation, the present disclosure may include that nouns following such articles are plural.

In the present disclosure, the term “A and B are different” may mean that “A and B are different from each other”. Note that this term may mean that “A and B are different from C”. The terms such as “separated” and “coupled” may be also interpreted in the same manner.

REFERENCE SIGNS LIST

10 . . . Image recognition device, 11 . . . Leg, 11*a* . . . Illumination unit, 10*b* . . . Illumination unit, 20 . . . Sorting device, 20*a* . . . Tray, 21 . . . Conveyor, 100 . . . Imaging device, 101 . . . Camera, 102 . . . Range sensor, 103 . . . Recognition unit, 104 . . . Communication device, 103*a* . . . Determination table

The invention claimed is:

1. An image recognition device comprising:

an imaging device configured to image one imaging surface of a recognition target;

a reflection device disposed to reflect another imaging surface of the recognition target to the imaging device; and processing circuitry configured to recognize the recognition target on the basis of a first image of the one imaging surface and a second image of the other imaging surface, wherein the processing circuitry recognizes a size of the recognition target, the image recognition device further includes a determination table for defining a size based on lengths in at least two of a longitudinal direction, a lateral direction, and a height direction of the recognition target, the processing circuitry recognizes two of the lengths in the longitudinal direction, the lateral direction, and the height direction of the recognition target based on the first image and the second image and recognizes the size of the recognition target with reference to the determination table, the determination table additionally defines a combination of two of the lengths in the longitudinal direction, the lateral direction, and the height direction as a size with a low accuracy and defines a combination of all the lengths in the longitudinal direction, the lateral direction, and the height direction as sizes with high accuracy, and the processing circuitry refers to the determination table on the basis of the recognized lengths in the directions.

2. The image recognition device according to claim 1, wherein the determination table defines a size of each type of the recognition target, and wherein the processing circuitry recognizes a type of the recognition target and recognizes the size of the recognition target with reference to the determination table corresponding to the type.

3. The image recognition device according to claim 1, wherein the processing circuitry recognizes the recognition target on the basis of a recognition score in at least one of the first image and the second image.

4. The image recognition device according to claim 1, wherein the reflection device includes at least two reflection devices, wherein the at least two reflection devices are provided in the vicinity of the recognition target, and wherein the at least two reflection devices are provided to reflect different second images of the recognition target to the imaging device.

5. The image recognition device according to claim 1, wherein the recognition target is carried along a carrying path which is installed in advance, wherein the imaging device is provided at a position at which one imaging surface of the recognition target carried along the carrying path is imaged, and wherein the reflection device is provided at a position at which another imaging surface of the recognition target is imaged.

* * * * *